Figure 1:
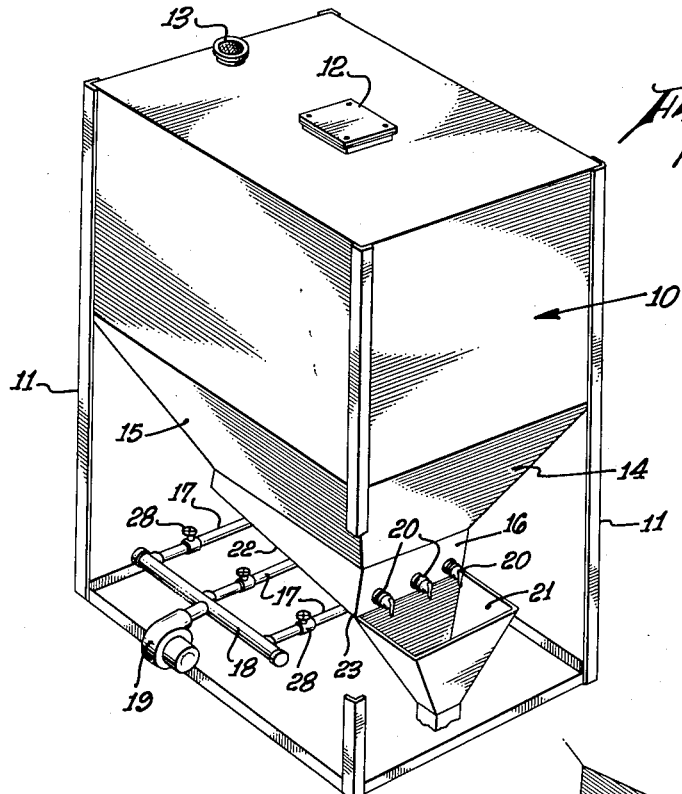

Nov. 8, 1955  E. W. LOUDEN ET AL  2,723,054
FEEDERS
Filed Oct. 4, 1951

EDGAR W. LOUDEN,
WILLIAM K. HOLLERON,
INVENTORS.

BY Delman H. Larsen

AGENT

United States Patent Office 2,723,054
Patented Nov. 8, 1955

2,723,054

FEEDERS

Edgar W. Louden and William K. Holleron, Houston, Tex., assignors to National Lead Company, New York, N. Y., a corporation of New Jersey Application October 4, 1951, Serial No. 249,718

2 Claims. (Cl. 222—195)

This invention relates to feeders, and to storage bins equipped with feeders, for the handling of pulverulent materials, such as ground barytes, ground Portland cement, finely ground limestone and the like. More particularly, it relates to feeders of a type in which movement of the powdered material is facilitated by aeration through a porous surface.

In the storage and feeding of powdered materials, a problem often encountered is that of feeding a fixed and known amount per minute of the material into some other part of a process, and of being able to make adjustments of known value simply and expeditiously. In particular, this is a problem in the treatment of drilling fluids used in the rotary drilling of oil and gas wells with weighting agents, which may consist of finely ground barytes, finely ground hematite, finely ground limestone, and the like, of which barytes ground to a fineness of 95 percent passing 325 mesh is the most commonly used. In recent years the transport and particularly the storage of such ground barytes in bulk have become increasingly common, but difficulties have arisen in the handling of barytes in bulk in that additions at a fixed rate to the mud system are difficult to control. For example, it may be desired to increase the weight per unit volume of the mud in the circulating mud system of a drilling well from say 10 pounds per gallon to 11 pounds per gallon. The total volume of mud in the circulating system can be computed, and the total circulation time determined, from which data it may be calculated that a certain number of pounds of barytes must be added each minute to the circulating mud stream. If when the barytes is actually added ot the mud in this fashion, the rate becomes greater than that calculated, a "slug" of heavy mud will be formed which may be excessively thick; and contrariwise, if the calculated rate of addition is not achieved, portions of the mud will be deficient in unit weight or density, all of which will lead to difficulties in the further handling and treatment of the mud and of the drilling.

Again, it may be desired to feed a small but steady amount of Portland cement, or slaked lime to a mud stream, and again a bulk storage container may be used, the uniform and steady discharge of the contents of which becomes a problem.

An object of the present invention is to provide a means of feeding finely ground material at a predetermined rate from a storage bin.

Another object of the invention is to provide a feeder for powdered materials in which the rate of discharge is instantly variable at fixed and predetermined rates.

Another object of the invention is to provide a feeder and storage bin for the uniform discharge of powdered materials therein without caking, hanging up, or plugging up of the material contained in the bin.

Other objects of the invention will become apparent as the description thereof proceeds.

Figure 2:
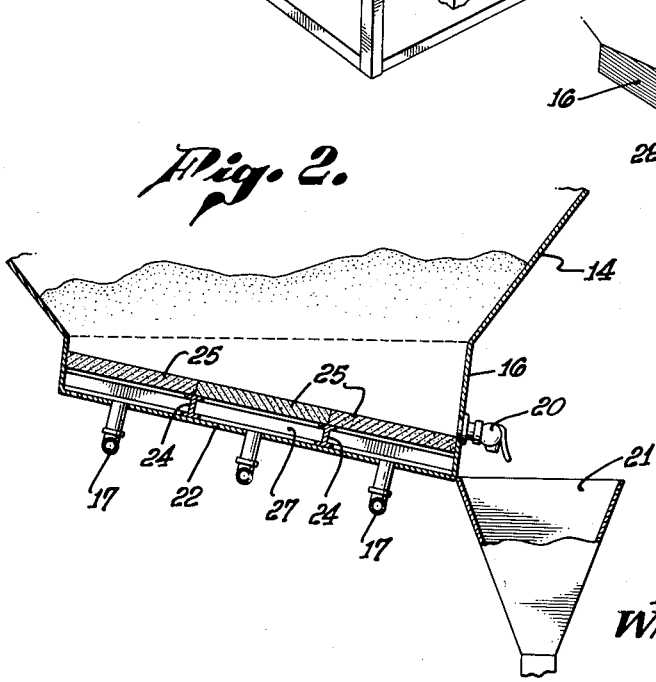

In the accompanying drawings, Figure 1 is a frontal view of a bin-feeder apparatus embodying the invention. Figure 2 is a partial view from the side of such an apparatus, and Figure 3 is a partially cutaway view showing the bottom portion of the feeder unit of the apparatus of Figures 1 and 2.

The operation of the invention will now be described, having reference to the drawings. Referring to Figure 1, 10 indicates the body portion of a storage bin which for convenience is mounted on and constructed integrally with a supporting stand 11. Powdered material can be loaded into the bin through a hatch 12, air escaping at the same time through a vent 13. A lower portion of the bin has sloping sides, 14 and 15, which lead into a feeder unit 16. The feeder unit is supplied with air under pressure through tubulations 17 equipped with valves 28 from a header 18, attached to a blower 19, all of which for convenience can be mounted integrally with the stand. The feeder discharges through a multiplicity of valves 20, which may conveniently be of the so-called molasses barrel or oil drum type, providing a free aperture upon opening; and these valves all discharge into a hopper 21. In the usual arrangement at a drilling well, the hopper 21, will be a part of the regular mud mixing system, such as is well known in the art. It will be noted that the lower side 22 of the apparatus of Figure 1, as may be seen more particularly from the side view of Figure 2, which also shows the bottom side 22, is inclined to the horizontal.

Figure 3:
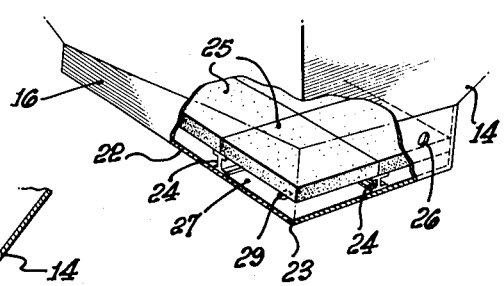

Figure 3 is a partially cutway view of the lower portion of the feeder unit of Figure 1 viewed from approximately the same angle. Reference figure 23 indicates the corresponding corner in both Figures 1 and 3. Referring now to Figure 3, it will be seen that the bottom of the feeder unit is covered by a network of spacers 24 set so as to give support to the edges of a layer of porous blocks 25 and at the same time to provide an air space underneath the porous blocks. The blocks may be set in mastic calking to insure airtightness around the edges. The opening for one of the valves is shown in the front wall of the feeder as 26, and it will be noted that this opening is set almost flush with the top of the porous block 25. One of the tubulations 17 from which air is supplied to the chamber 27 underneath the porous blocks is shown with its openings 29 into the chamber 27. It will be understood that in the case of Figure 3, the spacer giving support to the outer edges of the porous blocks 25 has been removed in order that the interior of the chamber may be delineated with greater clarity. The spacers 24 can readily be constructed when desired so as to furnish a relatively separate air chamber beneath each block or set of two or three blocks, so that by adjusting the air flow (by means of separate valves 28 on tubulations 17) to each such bulk-headed sub-chamber, movement of material from the rear portion of the feeder unit can be facilitated when desired; and in emptying the last of a charge of material air can be shut off entirely from the rearmost portion of the porous layer. It will be appreciated that the arrangement is such that if powdered material is placed in the bin through the hatch, it will come to rest on top of the layer of porous blocks, and that this same layer of porous blocks prevents powdered material from falling through into the air chamber 27, as shown in Figure 3.

The porous blocks used may conveniently be of the type made by sintering aluminum oxide of such a particle size and in such a manner that a block more or less freely permeable to air, but impermeable to powdered material in the 300 to 400 mesh range is formed. A sintered block 1½ inches thick, with such a permeability that 6 cubic feet of air per minute will be passed per square foot of area at 2 inches water pressure is suitable. Other thicknesses and permeabilities can likewise be used. Other porous media, such as a layer of canvas set on a perforated metal plate, could likewise be used but would not be as durable as the porous blocks which we prefer. We have found that for feeding barytes of the grade used in oil well drilling mud, a pressure in the air chamber of from 9 to 12 ounces per square inch is satisfactory for a permeability of 6 cubic feet per minute per square foot per 2 water-inch pressure.

The operation of our feeder is as follows: With the storage bin full or only partially full of ground material such as ground barite, but with no air supplied to the air chamber, opening the valves will have no effect. However, with air supplied to the porous layer under pressure, the powdered material immediately above the porous layer will be aerated and actually fluidified, to the extent of a thickness of half an inch or so. When one of the valves is opened, therefore, it is found that a steady stream of powdered material issues through the valve, its place being taken by more of the powdered material which comes down from above and becomes aerated and fluidified upon reaching the fluid zone. A second valve may be opened, resulting in approximately twice the output, and correspondingly a third valve may then be opened resulting in three times the output, for the case of all three valves being the same size.

Now we are aware of devices having some resemblance to our apparatus, among which may be mentioned the feeders shown in Goebels Patent 2,192,287 and Schemm Patent 2,316,814. However, we have carried out extensive experiments along these general lines, and we find that unless the particular combination of elements present in our invention is had, one fails to achieve the objects of our invention. We find that we need the combination of an inclined porous surface, the inclination being from about 4 degrees to 10 degrees to the horizontal, approximately 6 degrees being most suitable, with an air chamber underneath the porous layer to insure uniform air distribution, together with a valve opening set flush with the top of the porous layer, the valve being immediately in communication with the aerated layer and of the type which upon opening gives a free aperture to the outside. If a horizontal porous layer, such as shown in the Goebels or Schemm patents cited, is used, we fail to achieve a uniform and positive delivery rate; and if the discharge is separated from the top of the porous layer, as is caused by the baffle in the Schemm patent device and the extended tubulation of the Goebels patent feeder, then again, although the apparatus may feed, the rate of feed is not uniform for different degrees of filling of the bin and even varies in an erratic manner for a given degree of filling. If the lowest part of the valve opening is as little as one-half inch above the top of the porous layer, then uniform and dependable feeding is no longer achieved.

As an example of actual results obtained, where a commercial porous block designated as a "Filtros Type E" block of 1½ inches thickness was used, inclined at an angle of 8 degrees with the horizontal, and with an air pressure of 8 ounces per square inch measured in the air chamber below the block, then the efflux time for 100 pounds of oil field barytes of the brand known as "Baroid" was as follows:

| Size of Valve | Time of Efflux for 100 Pounds, seconds |
|---|---|
| 1 inch | 152 |
| 1½ inches | 61 |
| 2 inches | 35 |

The valves were ordinary barrel type gate valves such as are used on drums of viscous material such as molasses.

It will be seen that the invention accomplishes its objects. A device is provided which allows for storage of dry powdered material and a discharge of material from the storage compartment at predetermined rates. Such a feature is particularly indispensable around a drilling rig, as it is necessary to be able to set the feeder to feed at a known rate without attention over relatively long periods of time, since in general drilling personnel cannot be spared to watch over such an operation continuously for long periods of time.

It will be apparent that changes may be made in the apparatus over the specific embodiment shown and described herein and still be within the scope of the appended claims, and it is not contemplated that the invention be limited except as claimed herein.

We claim:

1. Storage and discharge apparatus for pulverous material having in combination, a tank and a constricted discharge chamber beneath and terminating said tank, said chamber having a porous plate floor inclined at an angle of from 4° to 10° to the horizontal and directly supporting the stored material, a plenum beneath said floor, means to introduce air into said plenum under pressure, a wall of said chamber at the lower end of said floor containing a plurality of like exit ports of small area in relation to the floor area, the lower portion of each exit port being at the level of the upper surface of the floor where it abuts said wall, and a valve tube extending from each exit port, having its axis generally parallel to the said floor and its outlet positioned for unrestricted discharge.

2. The apparatus of claim 1 in which said plenum chamber is divided into separate transverse compartments successively spaced upwardly from the exit port wall, and means to individually control the rate of air delivery to each compartment.

References Cited in the file of this patent

UNITED STATES PATENTS

| | | |
|---|---|---|
| 2,609,125 | Schemm | Sept. 2, 1952 |

FOREIGN PATENTS

| | | |
|---|---|---|
| 808,124 | France | Nov. 6, 1936 |
| 64,020 | Denmark | Oct. 8, 1945 |